(12) United States Patent
Zimmermann (10) Patent No.: US 7,112,053 B1
(45) Date of Patent: Sep. 26, 2006

(54) ROLL FORMING APPARATUS AND SYSTEM

(75) Inventor: Craig E. Zimmermann, Waconia, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 11/069,024

(22) Filed: Feb. 28, 2005

Related U.S. Application Data (60) Provisional application No. 60/549,044, filed on Mar. 1, 2004.

(51) Int. Cl.
*A21C 11/12* (2006.01)

(52) U.S. Cl. .................... 425/298; 425/423; 426/518

(58) Field of Classification Search ............... 425/298, 425/385, 423, 518; 426/512
See application file for complete search history.

(56) References Cited

U.S. PATENT DOCUMENTS

| | | | |
|---|---|---|---|
| 1,904,268 A | * | 4/1933 | Bronson ................ 264/153 |
| 2,263,173 A | * | 11/1941 | Johnson ................ 83/882 |
| 2,296,912 A | | 9/1942 | Erickson |
| 3,604,366 A | | 9/1971 | Jarrett |
| 4,318,678 A | | 3/1982 | Hayashi et al. |
| 4,375,348 A | | 3/1983 | Costa |
| 5,862,744 A | | 1/1999 | Hayes-Jacobson et al. |
| 5,979,285 A | | 11/1999 | Rasmussen et al. |

* cited by examiner

*Primary Examiner*—Donald Heckenberg
(74) *Attorney, Agent, or Firm*—Arlene L. Hornilla; J. Paul Haun (57) ABSTRACT

A roll forming apparatus having a shaft member for supporting a head member above a baking container housing a dough mass. The head member can include a plurality of arms with corresponding guide blades disposed therein for contacting a peripheral wall of the container. A tension assembly is mounted about the shaft member for adjusting movement and an outward force of each of the guide blades. Upon insertion in a baking pan, the head member's arms and guide blades divide the dough into a plurality of dough lobes without damaging the container. In a roll forming process, a rack is provided for receiving and transporting the roll forming apparatus over the container. A securing assembly is mountable about the shaft member for permitting the shaft member to resiliently pivot toward a generally perpendicular orientation with respect to the rack after the container pivotally displaces the head member.

14 Claims, 10 Drawing Sheets

Fig. 11

ROLL FORMING APPARATUS AND SYSTEM

REFERENCE TO RELATED APPLICATIONS

This application claims the benefit of priority under 35 U.S.C. § 119(e)(1) of a provisional patent application Ser. No. 60/549,044, filed Mar. 1, 2004, which is incorporated herein by reference in its entirety.

FIELD OF THE INVENTION

The invention relates to roll forming devices, particularly roll forming devices adapted to form a roll having a plurality of lobes interconnected by a web of dough.

BACKGROUND OF THE INVENTION

Bread and dinner roll forming devices, particularly roll forming devices adapted to form a roll having a plurality of lobes have been used. The roll forming devices or stampers typically have a shaft supporting a head or a roll forming body that presses into a ball or mass of dough placed in a baking pan. The roll forming body typically has retractable arms, each of which are coupled to the roll forming body by an internal horizontally oriented spring. Each of the internal springs biases the arms outward and prevents each arm from being removed from the roll forming body for purposes of routine cleanings. As a result, the movement of each of the retractable arms becomes restricted over time due to clogging caused by dough accumulation, thereby reducing the life of the roll forming body. Health concerns can also arise when the roll forming body cannot be properly cleaned due to the fixed nature of each of the retractable arms within the roll forming body.

Since the internal springs constantly exert a fixed outward force upon each of the retractable arms that engage the inner surface of the baking pan, such constant force can eventually damage the baking pans and the protective coatings on the inner surface. Moreover, any misalignments between the roll forming body and the baking pans can either cause substantial damage to the pan or may require the baking production to be slowed to align the pan with the roll forming body. As a result, the baking pans can deteriorate more quickly and throughput can be substantially reduced, thereby increasing the overall cost of producing the rolls.

SUMMARY OF THE INVENTION

In order to minimize health risks and production costs, while increasing productivity, it is desirable that the outwardly directing force of each of the guide blades be adjustable to limit the amount of damage to the inner surface of the baking pans. Moreover, it is also desirable to configure guide blades that are easier and faster to clean.

The roll forming apparatus, according to the various embodiments of the invention includes a shaft member for supporting a head member above a baking container or baking pan containing a unit of dough. The head member includes arms with corresponding guide blades disposed therein for contacting a peripheral wall of the baking container. A tension assembly is mounted about the shaft for adjusting movement of the guide blades between extended and retracted position. Upon insertion into the baking pan, the head member's arms and guide blades divide the unit of dough into a plurality of dough lobes, interconnected by a web of dough, without damaging the baking pan. In a related embodiment of the invention, the roll forming apparatus is resiliently pivotal to a generally perpendicular orientation with respect to a rack or supporting plate that supports the roll forming apparatus above the baking container.

The above summary of the various embodiments of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
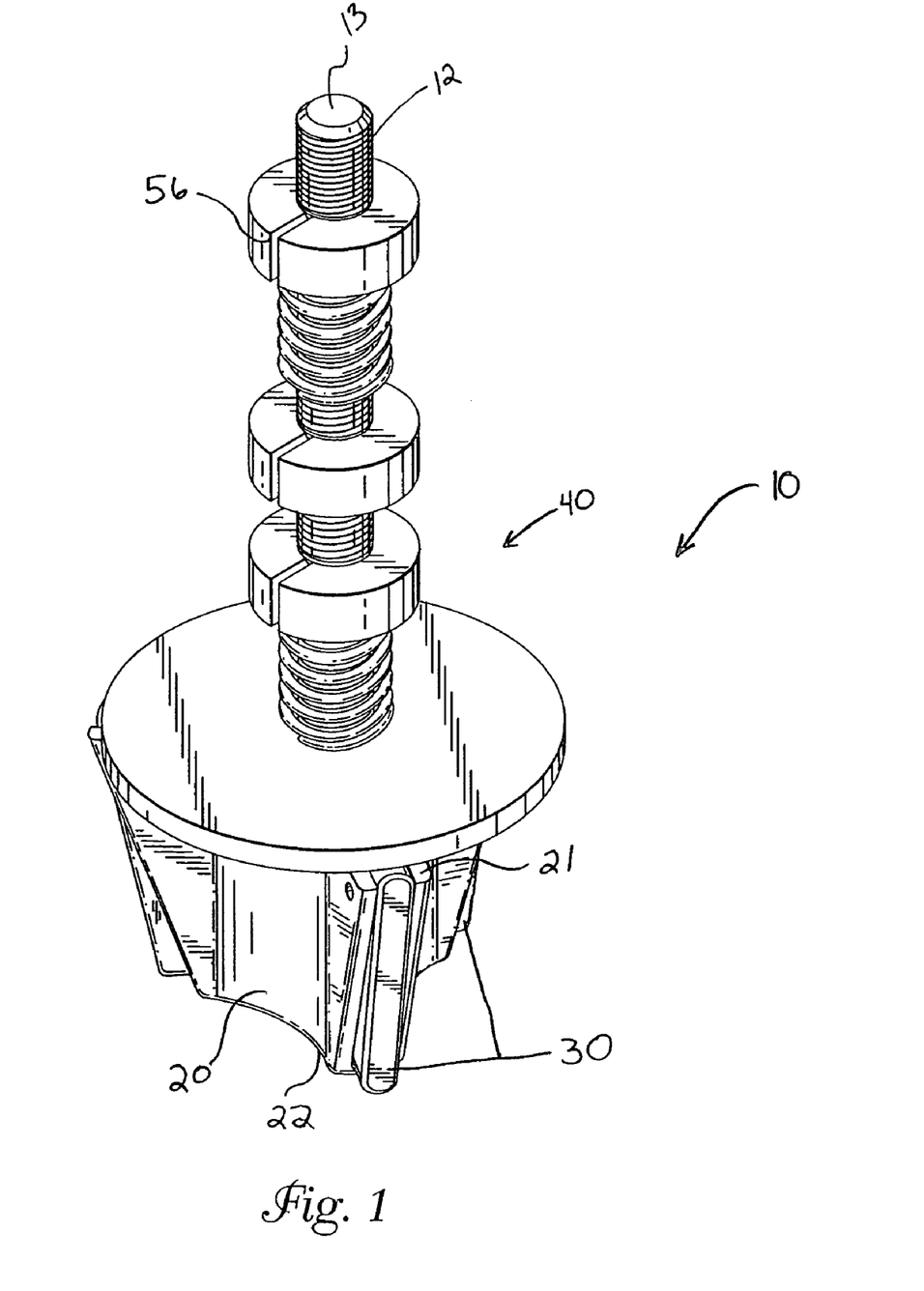
FIG. 1 is perspective view of a roll forming head member, shaft and tension arrangement of an embodiment of the invention.
Figure 2:
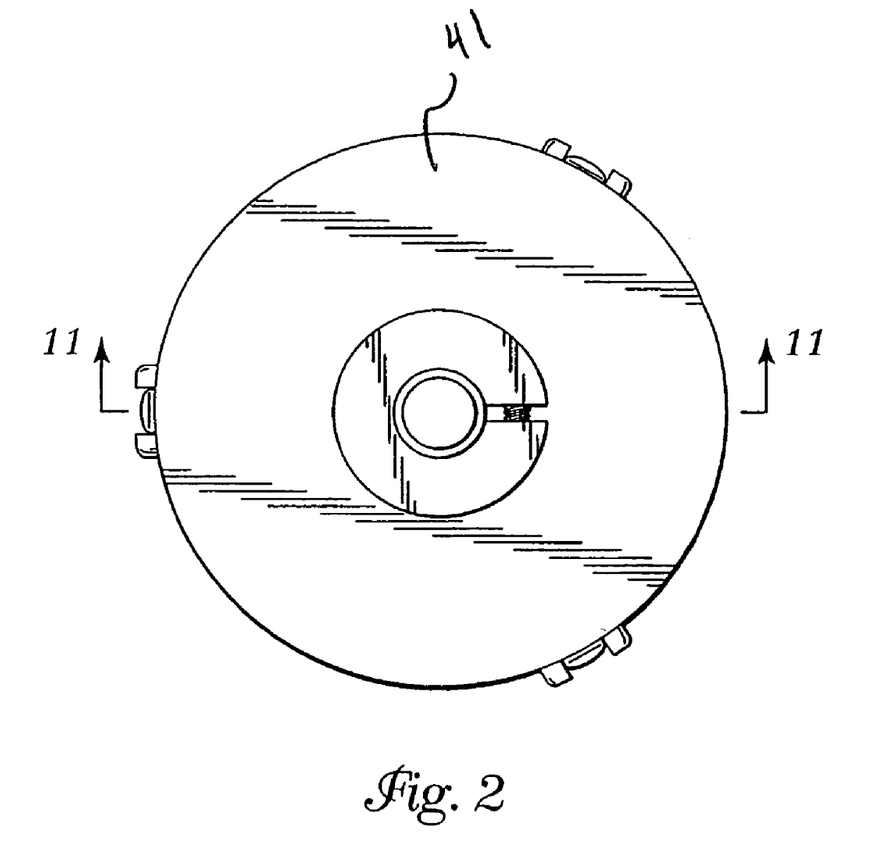
FIG. 2 is a top end plan view of the shaft and tension arrangement.

In an embodiment of the invention, a roll forming apparatus or device is provided, as shown generally at 10 in FIG. 1, the device being capable of forming a multi-lobed roll from a unit of dough. In an example embodiment, the roll forming apparatus of the invention comprises a head member disposed on a shaft member for supporting the head member above a baking container having a bottom wall and at least one peripheral wall. The head member has a plurality of outwardly radiating arms and a plurality of guide blades. Each of the guide blades is disposed in an interior of a respective arm and cantilevers between an extended position and a retracted position. A tension assembly is also included for adjusting the resistance of the guide blades from moving from the extended position toward the retracted position. In another embodiment, a securing assembly is mountable about the shaft member for pivotally securing the shaft member to a rack or a supporting plate above a baking pan.

Figure 4:
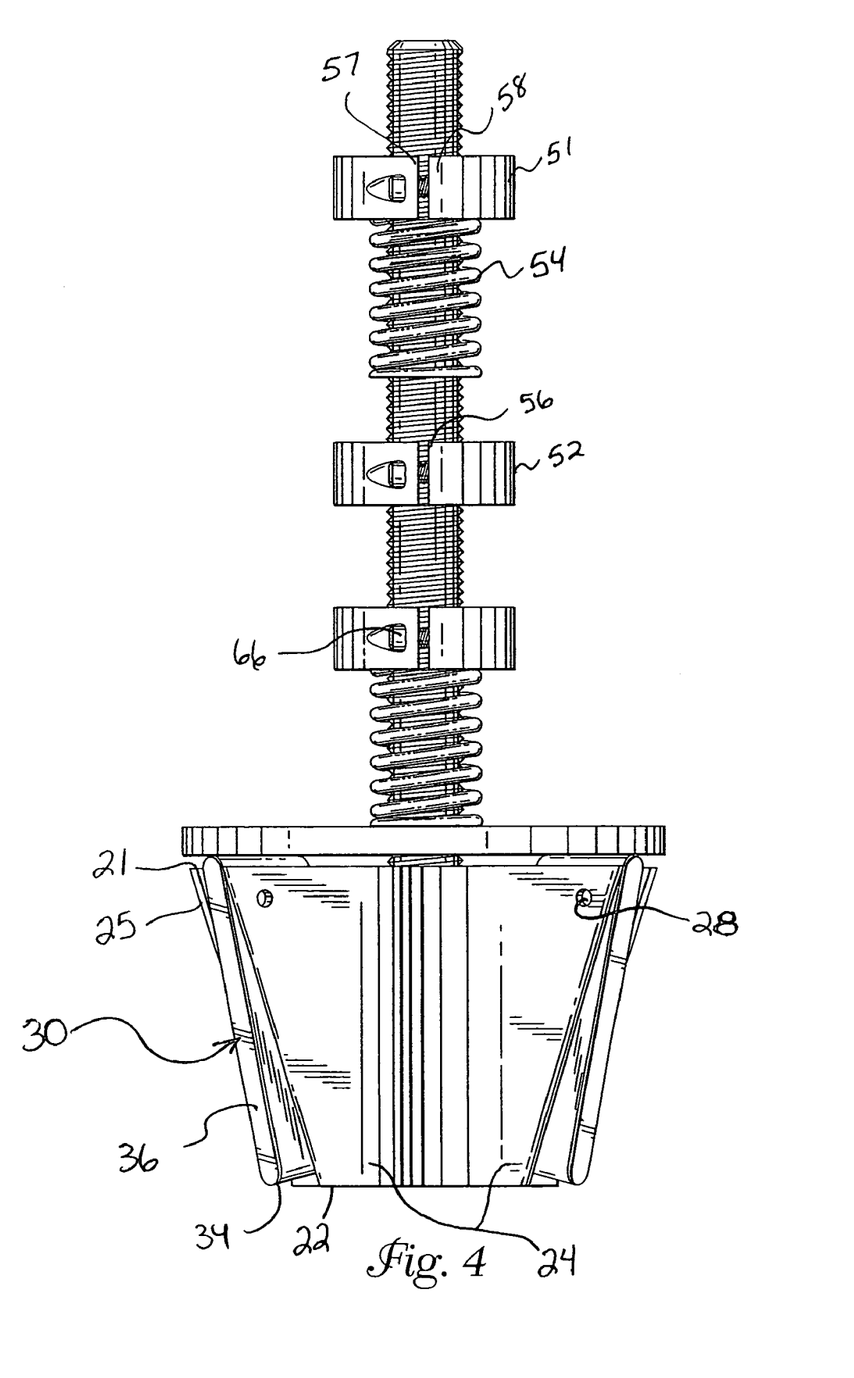
FIG. 4 is a side view of the roll forming head member, shaft and tension arrangement.
Figure 5:
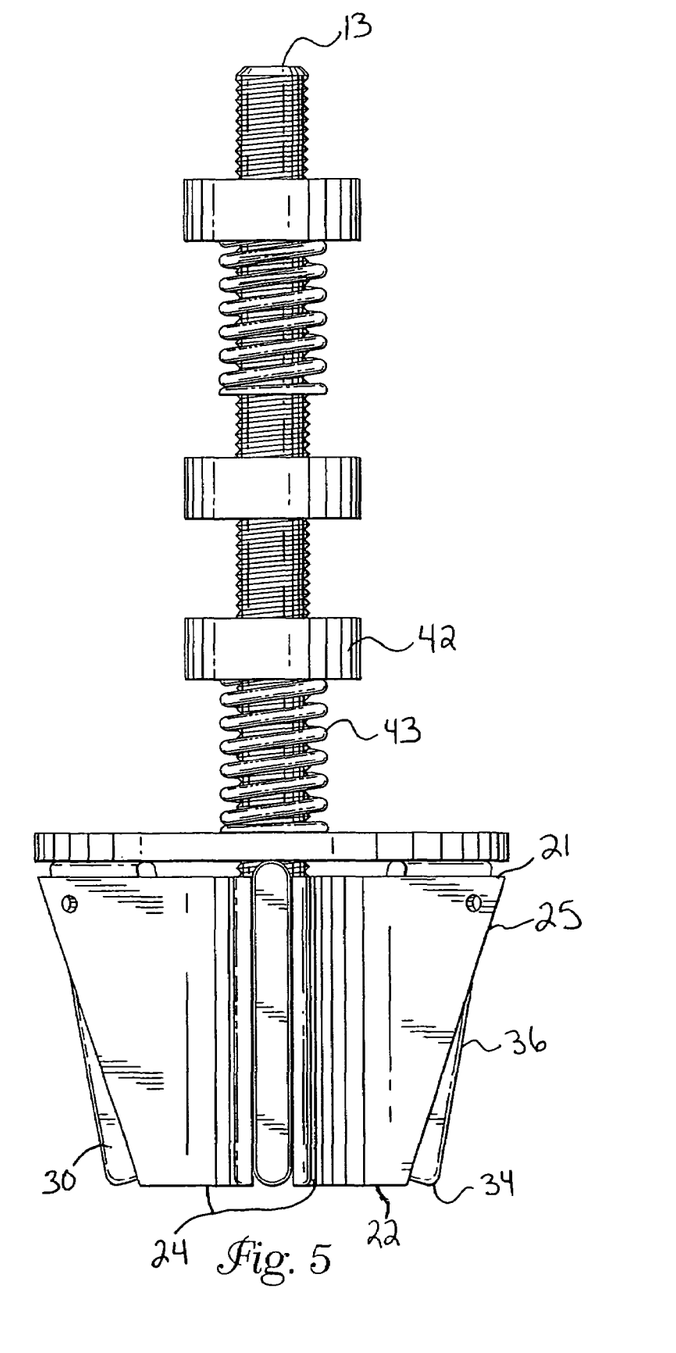
FIG. 5 is another side view of the roll forming head member, shaft and tension arrangement.
Figure 6:
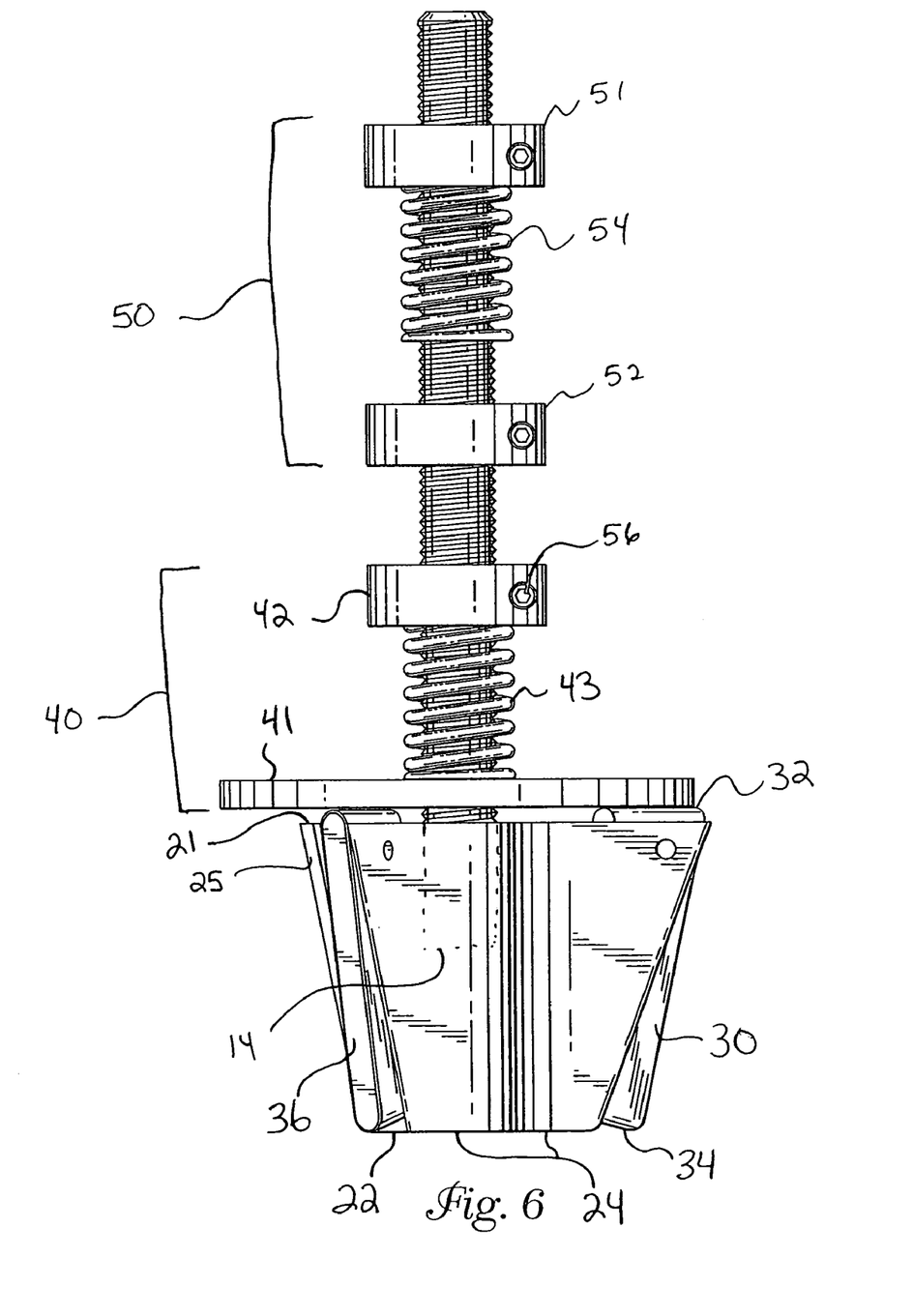
FIG. 6 is another side view of the roll forming head member, shaft and tension arrangement illustrating one of the guide blades in a retracted position.

FIG. 1 provides a perspective view of a roll forming apparatus 10 with a head member 20 disposed on a shaft member 12. Head member 20 divides the unit of dough or dough mass into a plurality of dough lobes interconnected by a web of dough. In this embodiment, head member 20 has a proximal end 21 and a distal end 22. As illustrated in FIGS. 4–6, a plurality of arms 24 extend generally from proximal end 21 toward distal end 22 divides the unit of dough in the baking container into the dough lobes of a multi-lobed or multi-leaf roll. Referring again to FIG. 1, distal end 22 is blunt such that when head member 20 is pressed into the baking container, the dough is pressed generally downward forming the web of dough that interconnects the bottom surfaces of each of the dough lobes. The thickness of the web of dough varies depending upon the depth of insertion of head member 20 into the baking container.

Figure 3:
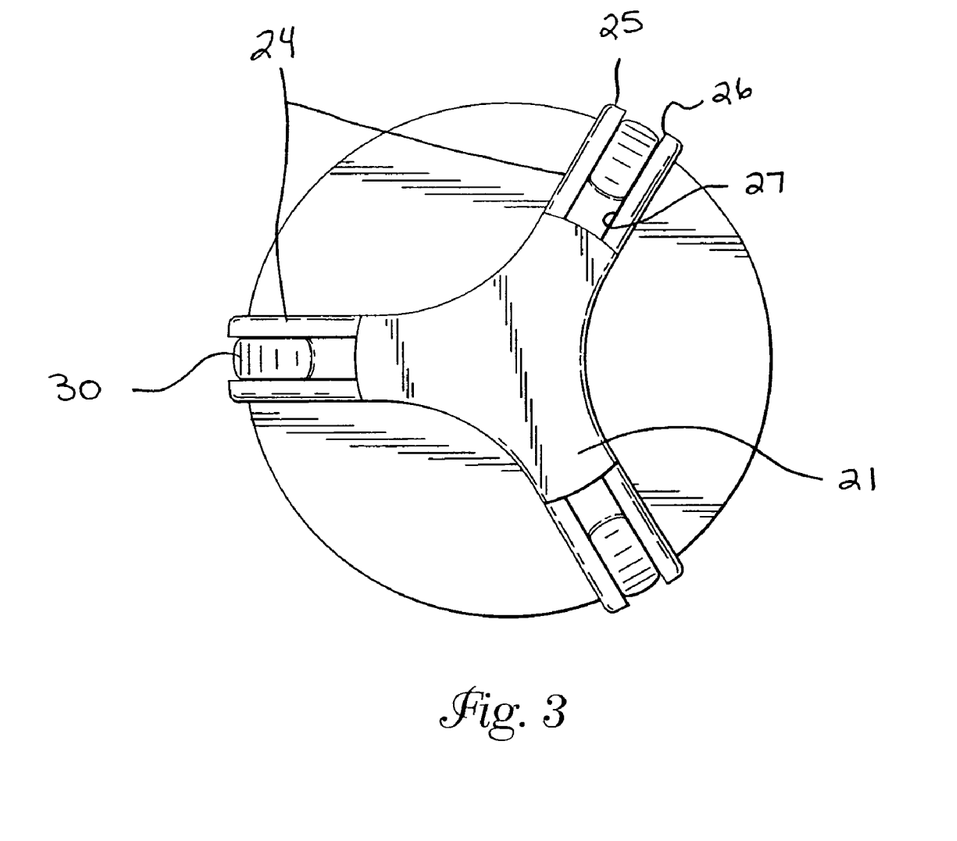
FIG. 3 is a bottom end plan view of the roll forming head with arms and guide blades.

Referring to FIG. 3, in this embodiment each of the arms 24 has a free end 25 extending between proximal 21 and distal 22 ends. Free end 25 of each of the arms 24 has an opening 26 extending into an interior 27 therein. As particularly illustrated in FIGS. 1 and 4–6, each of the plurality of arms 24 has a length that tapers from proximal end 21 toward distal end 22. The tapering of each of the plurality of arms 24 permits head member 20 to be insertable into baking containers having sloping peripheral walls and for inserting into baking containers with varying interior diameters. FIG. 3 illustrates a plurality of guide blades 30 disposed in interior 27 of head member 20. Each of guide blades 30 is adapted for independently contacting an inner surface of the peripheral wall of the baking container.

In the embodiment illustrated in FIGS. 5–6, each of guide blades 30 has first 32 and second 34 opposed edges and a free edge 36 extending therebetween. Referring to FIG. 6, first 32 and second 34 opposed edges may be generally rounded and free edge 36 may be generally blunt. However, free edge 36 may also be generally rounded such that it has an outer surface that permits it to make generally full contact with an inner surface of the peripheral wall of the baking container.

In one embodiment, each of guide blades 30 is independently positionable between an extended and a retracted position with respect to head member 20. The extended position is characterized by free edge 36 of each of the guide blades 30 being generally non-parallel to free end 25 of each of the arms 24 for purposes of cleaning head member 20. The retracted position is characterized by free edge 36 of each of the guide blades 30 becoming more generally parallel to free end 25 of each of the plurality of arms 24 after head member 20 is inserted into the baking container. In the retracted position, free edge 36 exerts an outward force.

In an embodiment of the invention, as illustrated in FIG. 4, a pin 28 pivotally couples each of guide blades 30 in a corresponding interior 27 of the plurality of arms 24 to permit guide blades 30 to cantilever between the extended (untensioned) and retracted (tensioned) positions. Pin 28 is positioned generally adjacent distal end 21 and free end 25 of the plurality of arms 24.

FIGS. 4–6 provide side views of a device according to an embodiment of the invention, illustrating shaft member 12 having first 13 and second 14 opposed ends with second end 14 of shaft member 12 coupled to head member 20. An outer surface of shaft member 12 can be threaded as shown, to permit threaded engagement of tension assembly 40. Alternatively, an entire length of the outer surface of shaft member 12 may be threaded. As illustrated in FIG. 6, second end 14 of shaft member 12 is threadedly disposed in a threaded bore extending into proximal end 21 of head member 20 to permit removal of shaft member 12 for cleaning. Shaft member 12 can comprise a substantially rigid material such as steel or aluminum. One skilled in the art would appreciate that other materials may be utilized.

Tension assembly 40 is removably mountable about shaft member 12 for adjusting a resistance of movement of each of the guide blades 30 from the extended position toward the retracted position. FIG. 6 illustrates tension assembly 40 having a plate member 41 and a biasing member 43 to bias plate member 41 to retractably engage first edge 32 of each of the guide blades 30. Plate member 41 is positioned generally adjacent to proximal end 21 of head member 20. As illustrated in FIG. 6, first edges 32 of guide blades 30 extend generally above proximal end 21 of head member 20.

Figure 11:
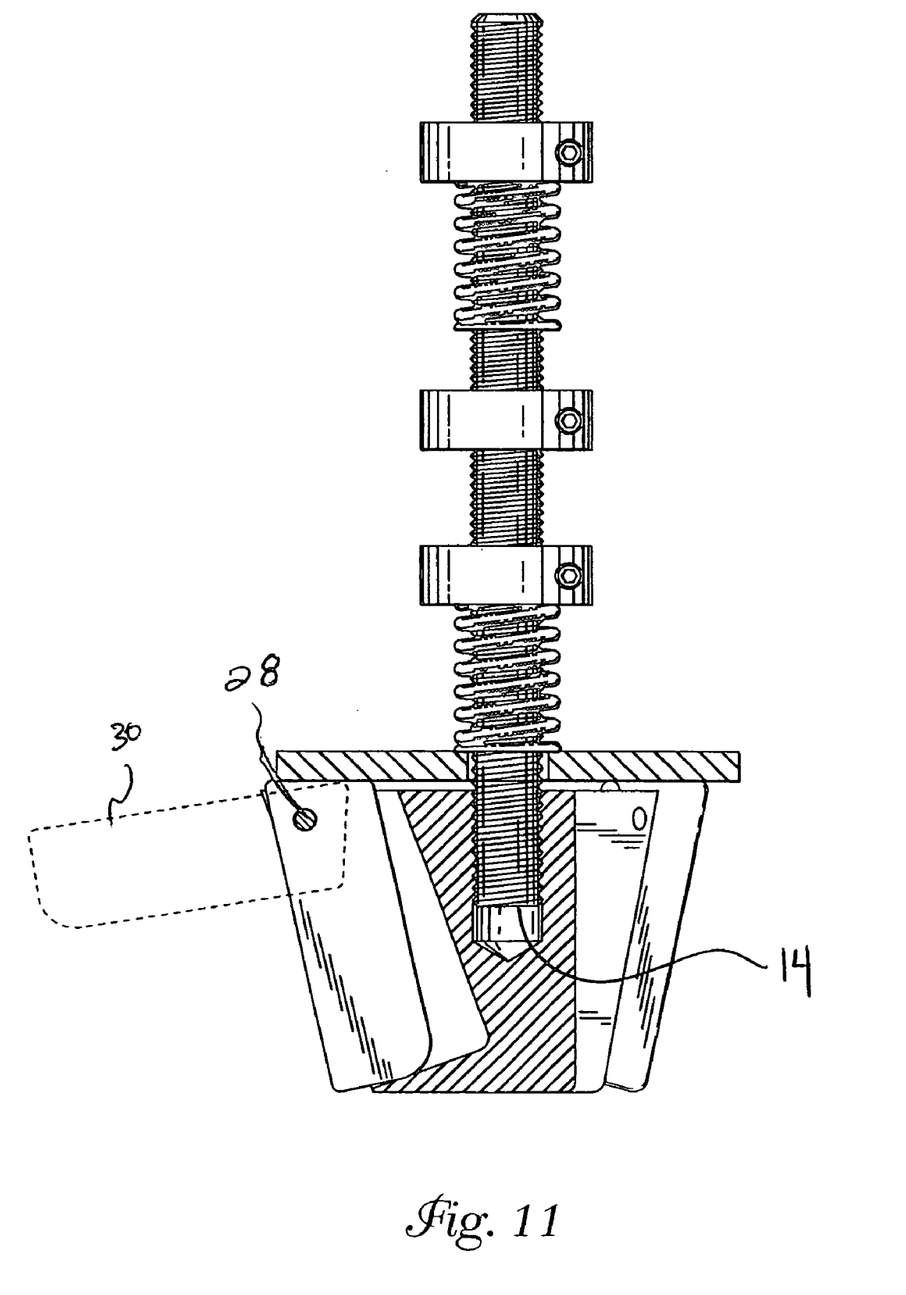
FIG. 11 is a partial cutaway side view of a guide blade extending out of an interior of the head member for cleaning.

In one embodiment, before head member 20 is inserted into a baking container, biasing member 43 and plate member 41 generally maintains guide blades 30 in the extended positions. Referring to FIGS. 6 and 11, plate member 41 is generally retractable toward first end 13 of shaft member 12 to permit a substantial portion of each of guide blades 30 to freely cantilever out of interior 27 and away from head member 20 for thorough cleaning of arms 24 and guide blades 20.

In another embodiment, as illustrated in FIG. 6, tension assembly 40 can include a collar 42 that is threaded about shaft member 12. Collar 42 is positioned on shaft member 12 such that biasing member 43 is disposed generally between collar 42 and plate member 41. In this embodiment, rotation of collar 42 clockwise compresses biasing member 43 against plate member 41, thereby increasing the resistance of movement of guide blades 30 from the extended position toward the retracted position as head member 20 is inserted into the baking container and each of guide blades 30 contacts the peripheral wall of the baking container. Likewise, counterclockwise rotation of collar 42 reduces the resistance of guide blades 30 moving from the extended position toward the retracted position. Depending upon the baking container being used, guide blades 30 resistances can be adjusted to prolong the life of the baking container. Collar 42 is a threaded nut and biasing member 43 is a helical spring. However, one skilled in the art would appreciate that other types of fasteners and biasing members may be utilized to regulate the resistance of movement of guide blades 30 from the extended position toward the retracted position.

Figure 7:
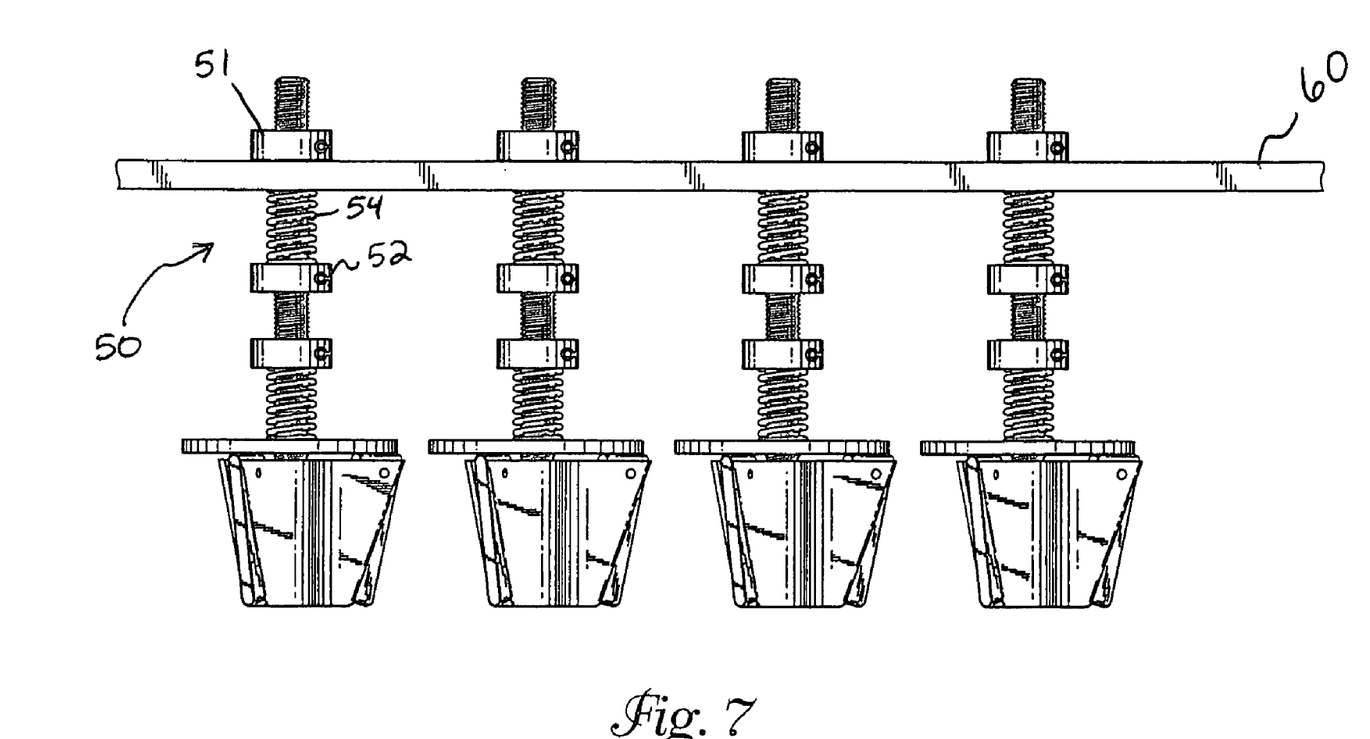
FIG. 7 is side view of a plurality of roll forming apparatus coupled to a rack.
Figure 8:
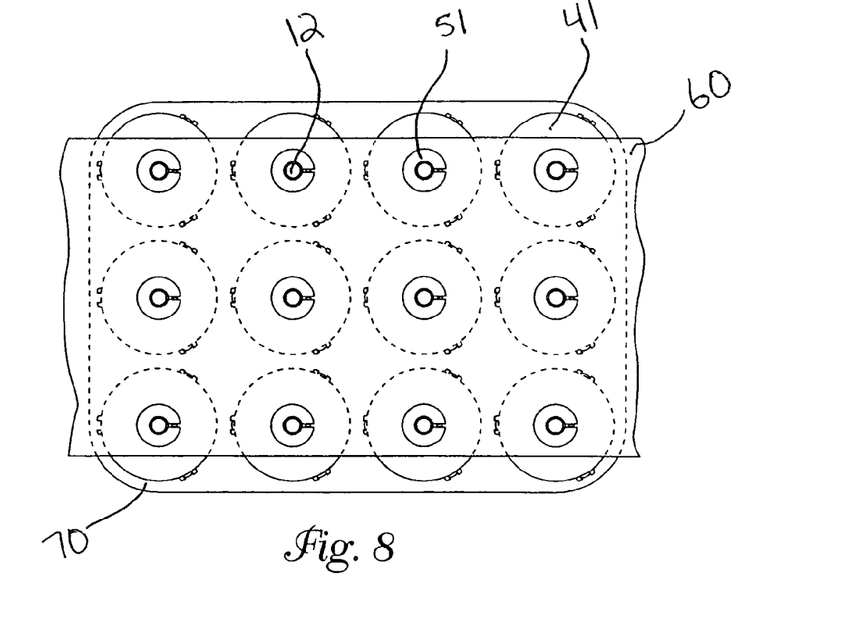
FIG. 8 is a top plan view of the roll forming system illustrating a plurality of the roll forming apparatus inserted into a baking container.
Figure 9:
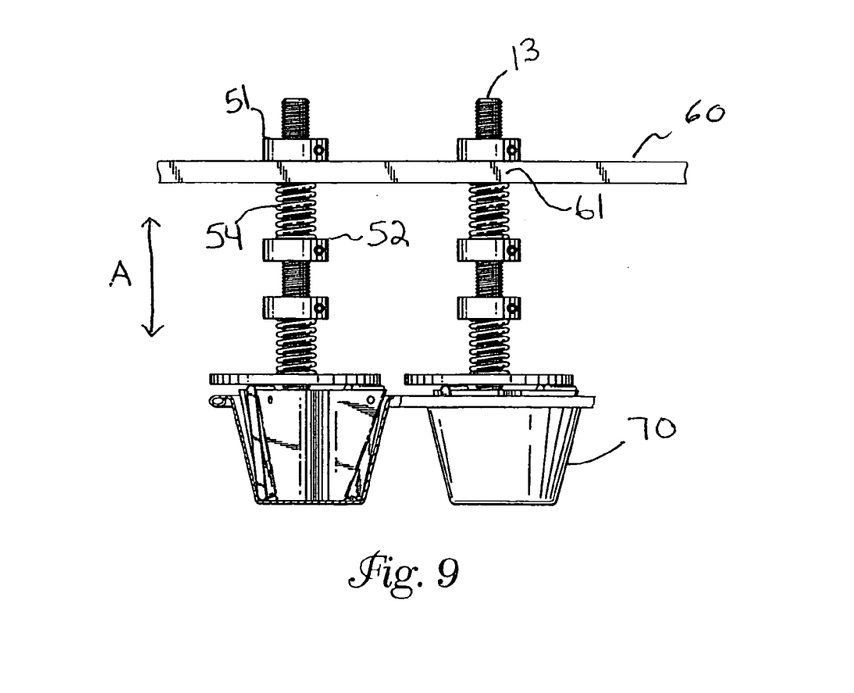
FIG. 9 is a partial cutaway side view illustrating a head member of the roll forming apparatus disposed in a baking container.

As illustrated in FIGS. 4–11, a securing assembly 50 is mountable about shaft member 12 to removably secure shaft member 12 to a rack 60 (or supporting plate) that carries shaft member 12 and head member 20 to the baking container. As illustrated in FIGS. 6 and 7, securing assembly 50 may include first 51 and second 52 coaxially opposed securing members and a compression member 54 coaxially disposed on shaft member 12 and positioned generally therebetween. As illustrated in FIGS. 7 and 9, shaft member 12 and head member 20 are resiliently pivotal to a generally perpendicular orientation with respect to rack 60.

FIG. 8 provides a top plan view of rack 60 supporting shaft member 12 and a plurality of head members 20 above a baking container 70. Head members 20 and baking container 70 are shown in an aligned position in registration with an interior of the baking container. This embodiment also shows an arrangement of head members 20 with respect to rack 60. The arrangement and number of head members 20 can vary depending upon the number of rolls being formed. This arrangement can be part of a manual or automatic roll forming system.

As illustrated in FIG. 9, rack 60 can raise and lower head members 20 into the interior of container 70, such as in the directions shown by Arrow A. In this embodiment, first end 13 of shaft member 12 is disposable into a hole 61 of rack 60 having a diameter generally larger than a diameter of shaft member 12 but generally smaller than an outer diameter of securing members 51 and 52. Rack 60 is generally positioned between first securing member 51 and an end of compression member or spring 54. Second securing member 52 is threadedly adjustable about shaft member 12 and operably abuttable compression member 54. In this embodiment, counterclockwise rotation of second securing member 52 compresses compression member 54 and sandwiches rack 60 between first securing member 51 and compression member 54.

Figure 10:
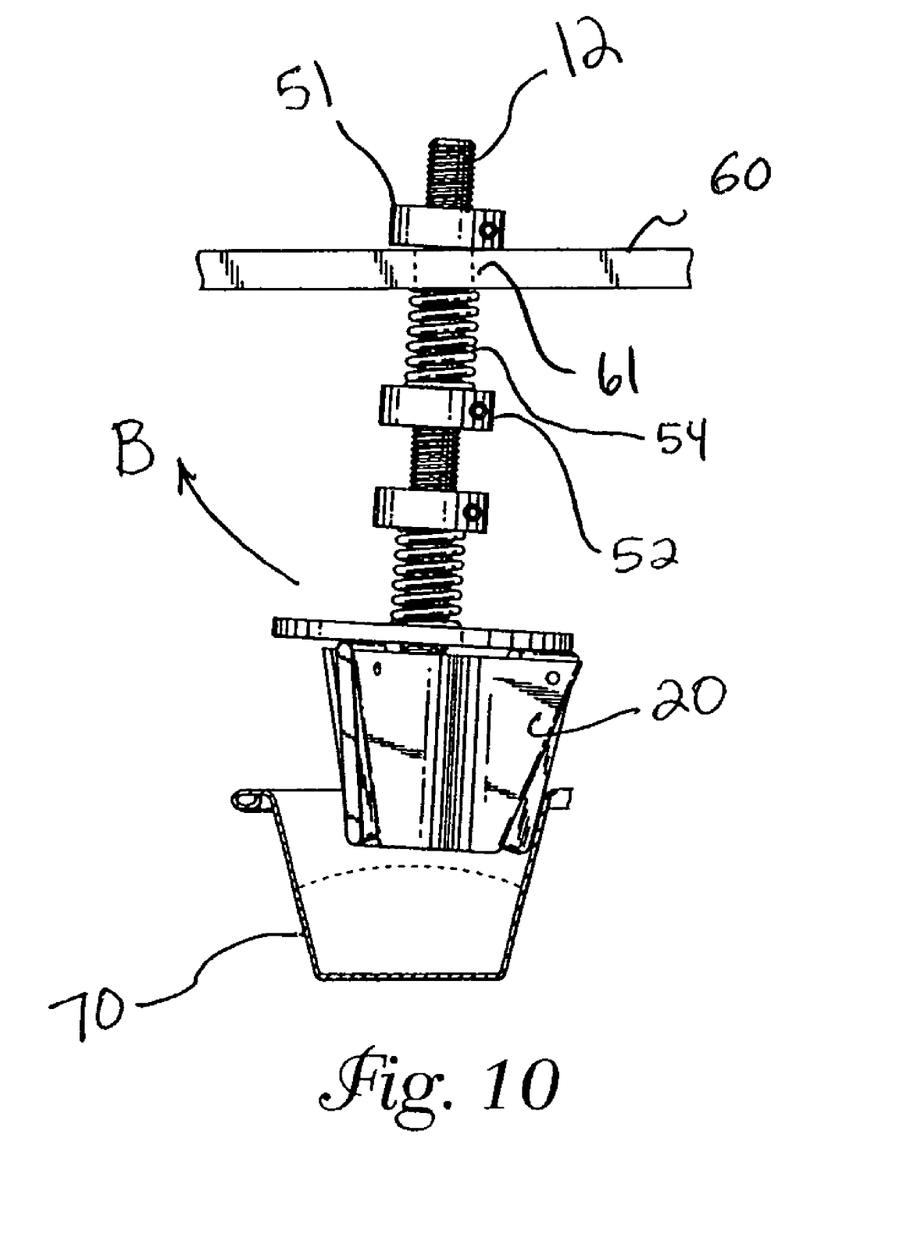
FIG. 10 is a side view of a portion of the roll forming system illustrating adjustment by the roll forming device when the rack is misaligned with the baking container.

Referring to FIG. 10, pivotal movement of shaft member 12 in hole 61 of rack 60 permits head member 20 to pivot in a manner that it is free to enter baking container 70 that is generally out of alignment with head member 20. Compression member 54 generally acts to permit shaft member 12 and head member 20 to resiliently pivot to a generally perpendicular orientation with respect to rack 60 after being removed from a baking container unaligned with head member 20. Rotation of first 51 and second 52 securing members adjusts the resistance of shaft member 12 to pivot between a generally perpendicular orientation and a generally non-perpendicular orientation with respect to rack 60. As particularly illustrated in FIG. 10, shaft member 12 can freely pivot in hole 61 such as in direction of Arrow B.

Referring back to FIGS. 4 and 6, collar 42 and first 51 and second 52 securing members each have a split 56 extending therein forming a pair of opposed ends 57 and 58. A fastener 66 extends into and operably couples opposed ends 57 and 58 of collar 42 and first 51 and second 52 securing members. In one embodiment, rotation of fasteners 66 loosens or tightens collar 42 and first 51 and second 52 securing members with respect to shaft member 12. Fasteners 56 may comprise a hex nut or any other conventional fastener known to one skilled in the art.

In operation, a baking container may be carried along a process line via a conveyor belt assembly to various operations such as roll forming, baking and packaging. During a roll forming operation, rack 60 lowers head member 20 into baking container 70, as illustrated in FIGS. 8–10. Guide blades 30 contact the inner surface of the peripheral wall of the baking container. As head member 20 extends into the baking container, the peripheral wall of the baking container causes guide blades 30 to cantilever from the extended position toward the retracted position. Head member 20 with arms 24 and guide blades 30 compress dough downward into the baking pan and form the web of dough. Rack 60 can then be lifted away from the baking container withdrawing head member 20. When head member 20 is extracted from the baking container, tension assembly 40 can cause guide blades 30 to cantilever outwardly from the retracted position toward the extended position.

Rotation of collar 42 about shaft member 12 can increase or decrease the resistance of each of the guide blades 30 to cantilever from the extended position toward the retracted position. Once a desired level of resistance is obtained, fastener 66 sets collar 42 in position. Adjusting movement of resistance of guide blades 30 permits a user to set the amount of contact between guide blades 30 and the peripheral wall of the baking container. The length of time a baking container can be used is extendable by adjustment of tension assembly 40.

In a baking operation, a plurality of baking containers may be connected to form a baking container unit. A unit of dough can be placed into each of the baking containers of the baking container unit by any number of processes. Rack 60 may have a plurality of holes 61 arranged in rows corresponding to a generally similar arrangement of the baking containers in the baking container unit. A plurality of roll forming devices 10 is securable to rack 60 in a manner as described above. Rack 60, as described in this operation, may be movable along the baking process line to a plurality of baking container units at various points along the processing line. As a result, a substantial increase in roll formation output is obtained.

Roll formation output can be increased by a reduction in the number of interruptions of roll formation processing. As the plurality of baking container units is conveyed on the conveyor belt, it is not uncommon for some of them to move slightly from their original positions. This is also possible in a manual system of baking. As a result, a baking container unit may become misaligned with the operational positioning of rack 60. However, the ability of each of the roll forming devices 10 to pivot with respect to rack 60 permits head members 20 to enter the baking containers of the baking container unit and form the rolls from the measured units of dough. Additionally, when rack 60 is raised, head members 20 from the misaligned baking container unit each of the roll forming devices 10 can be returned to a generally perpendicular orientation with respect to rack 60 for proper insertion into the next baking container.

The invention may be embodied in other specific forms without departing from the essential attributes thereof; therefore, the illustrated embodiments should be considered in all respects as illustrative and not restrictive, reference being made to the appended claims rather than to the foregoing description to indicate the scope of the invention.

I claim:

1. A roll forming apparatus for forming at least one roll from a unit of dough that is disposed within a baking container adapted for baking, the baking container having a bottom wall and at least one peripheral wall, said apparatus comprising:
    a head member adapted for dividing the measured unit of dough into a plurality of lobes upon insertion into the baking container, said head member comprising generally opposed distal and proximal ends and a plurality of arms, each of said arms extending from said distal end to said proximal end of said head member, wherein said distal end is configured to form a web of dough connecting each of the lobes formed by said plurality of arms;
    a shaft member coupled to said proximal end of said head member and adapted to support said head member over the measured unit of dough;
    a plurality of guide blades disposed in said head member and adapted to contact an inner surface of the baking container, each of said plurality of guide blades is positioned in a corresponding opening at each of said plurality of arms, each of said guide blades cantilevers between an extended position and a retracted about a pin, said pin located adjacent said proximal end of said head member; and
    a tension assembly mounted about said shaft member and adapted for retractably engaging each of said guide blades, wherein said tension assembly controls an amount of resistance in movement of each of said guide blades from said extended position toward said retracted position when said guide blades contact the inner surface of the baking container.

2. The apparatus of claim 1, wherein said distal end of said head member has a generally blunt surface for forming the web of dough interconnecting the lobes of dough when head member is pressed into the baking container.

3. The apparatus of claim 1, wherein each of said plurality of arms has a free end, wherein a length of each of said arms tapers from said proximal end toward said distal end.

4. The apparatus of claim 1, wherein each of said guide blades has first and second opposed edges and a free edge that is retractably extendable out of said opening of said plurality of arms for contacting the peripheral wall of the baking container.

5. The apparatus of claim 4, wherein said first and second edges are generally rounded and said free edge is generally blunt.

6. The apparatus of claim 4, wherein said free edge is generally non-parallel to said free end of said plurality of arms when in said extended position and generally parallel to said free end of said plurality of arms when in said retracted position.

7. The apparatus of claim 1, wherein said tension assembly comprises a plate member, a collar and a biasing member disposed therebetween, said plate member positioned generally adjacent to said proximal end of said head member and retractably abuttable to each of said plurality of guide blades.

8. The apparatus of claim 7, wherein said collar is adapted to control compression and decompression of said biasing member in order to adjust a resistance of movement of each of said guide blades from said extended position toward said retracted position.

9. The apparatus of claim 8, wherein said collar has a split extending therein forming a pair of opposed ends and a fastener operably coupling each of said opposed ends for setting a position of said collar on said shaft member.

10. The apparatus of claim 1, further comprising a securing assembly mountable about said shaft member for securing said shaft member to a rack adapted to support said head member over the dough.

11. The apparatus of claim 10, wherein said securing assembly includes first and second coaxially opposed securing members and a compression member disposed therebetween.

12. A roll forming system comprising:
at least one baking container having a bottom wall and at least one peripheral wall for housing a measured unit of dough;
a rack disposed over said at least one baking container; and
a roll forming apparatus having
a head member adapted for dividing the measured unit of dough into a plurality of lobes upon insertion into the at least one baking container, said head member comprising generally opposed distal and proximal ends and a plurality of arms, each of said arms extending from said distal end toward said proximal end of said head member, wherein said distal end is configured to form a web of dough connecting each of the lobes formed by said plurality of arms;
a shaft member coupled to said proximal end of said head member and adapted to support said head member over the measured unit of dough; and
a securing assembly mountable said shaft member for removably securing said shaft member to said rack and for permitting said shaft member to resiliently pivot to a generally perpendicular orientation with respect to said rack after said head member is pivotally displaced by said baking containers;
he system further comprising a plurality of guide blades disposed in said head member and adapted to contact said at least one peripheral wall of said baking container, each of said plurality of guide blades is positioned in a corresponding opening at each of said plurality of arms and cantilevers between an extended position and a retracted about a pin located adjacent said proximal end of said head member.

13. The system of claim 12, further comprising a tension assembly mounted about said shaft member and adapted for retractably engaging each of said guide blades, wherein said tension assembly controls an amount of resistance in movement of each of said guide blades to cantilever from said extended position toward said retracted position when said guide blades contact said peripheral wall of said baking container.

14. The system of claim 12, wherein said tension assembly comprises a plate member, a collar and a biasing member disposed therebetween, said plate member positioned generally adjacent to said proximal end of said head member and retractably abuttable to each of said plurality of guide blades.

* * * * *